March 1, 1966 C. D. HOGG 3,237,867
IRRIGATION SYSTEM (STABILIZER)
Filed Nov. 14, 1963 2 Sheets-Sheet 1

CARL D. HOGG
INVENTOR.

BY

March 1, 1966   C. D. HOGG   3,237,867
IRRIGATION SYSTEM (STABILIZER)
Filed Nov. 14, 1963   2 Sheets-Sheet 2

CARL D. HOGG
INVENTOR.

BY

United States Patent Office 3,237,867
Patented Mar. 1, 1966

3,237,867
IRRIGATION SYSTEM (STABILIZER)
Carl D. Hogg, Clovis, N. Mex., assignor, by mesne assignments, to The J. B. Knight Co., Inc., Brownfield, Tex., a corporation of Texas
Filed Nov. 14, 1963, Ser. No. 323,768
2 Claims. (Cl. 239—212)

This invention relates to agricultural irrigation and more particularly to a sprinkler system.

In agricultural sprinkler systems, there is a problem of stabilizing the pipes which are moved about in the field. I have solved this problem by providing a foot which is actuated by the pressure of the water within the sprinkler system. The foot is moveable so that the pressure of the water within the system presses the foot against the ground when there is water pressure within the system. When there is no pressure within the system, a spring picks the foot up from the ground and pulls it into an inactive position for movement of the pipe.

An object of this invention is to stabilize an irrigation pipe moving system.

Another object of this invention is to utilize the pressure within the pipe to stabilize an irrigation pipe moving system.

Another object of this invention is to provide a stabilizer for a pipe which is moved axially through the field so that when the field is being irrigated from the pipe, the water spraying from the sprinkler does not tend to rotate the pipe about its axis.

A further object of this invention is to provide a stabilizer for a pipe which is moved through the field elevated above the ground so as to support the pipe when it has water therein.

Still further objects are to achieve the above with a device that is sturdy, compact, durable, simple, versatile, and reliable, yet inexpensive and easy to manufacture and operate.

The specific nature of the invention as well as other objects, uses, and advantages thereof will clearly appear from the following description and from the accompanying drawing, the different views of which are not necessarily to the same scale, in which.

Figure 1:
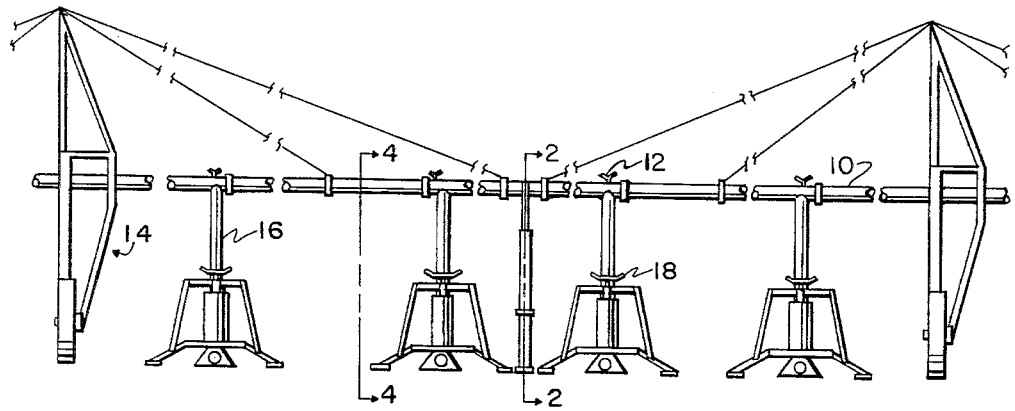
FIG. 1 is a partial elevational view of an irrigation system utilizing the invention.

Referring to the drawings, particularly to FIG. 1, one sees a moving irrigation system having a main pipe 10 above the ground adapted to carry water under pressure with a plurality of sprinklers 12 located thereon. The sprinklers 12 are for sprinkling water on the land to be irrigated. A plurality of means for moving the pipe 10 are shown in the form of vehicles 14. Inasmuch as vehicles for moving pipe are well known to the art, e.g., Behlen's U.S. Patent No. 2,726,895, they will not be discussed further.

Attached to the main pipe 10 are a plurality of trail pipes or tubes 16 which are adapted to be dragged axially along the land to be watered. Each of these trail tubes 16 has at least one sprinkler 18 thereon to sprinkle water on the land to be irrigated. The trail pipe 16 also is adapted to carry water under pressure and the main pipe 10 is a means for supplying the trail pipe 16 with water under pressure. Likewise, the main pipe 10 is a means for moving the trail tube 16. The system will be operated with water under pressure within the main pipe 10 and will be stationary while it is irrigating a certain land. After one land has been watered, the main pipe 10 will be empty while it is moved to the next land to be watered.

Figures 2, 3:
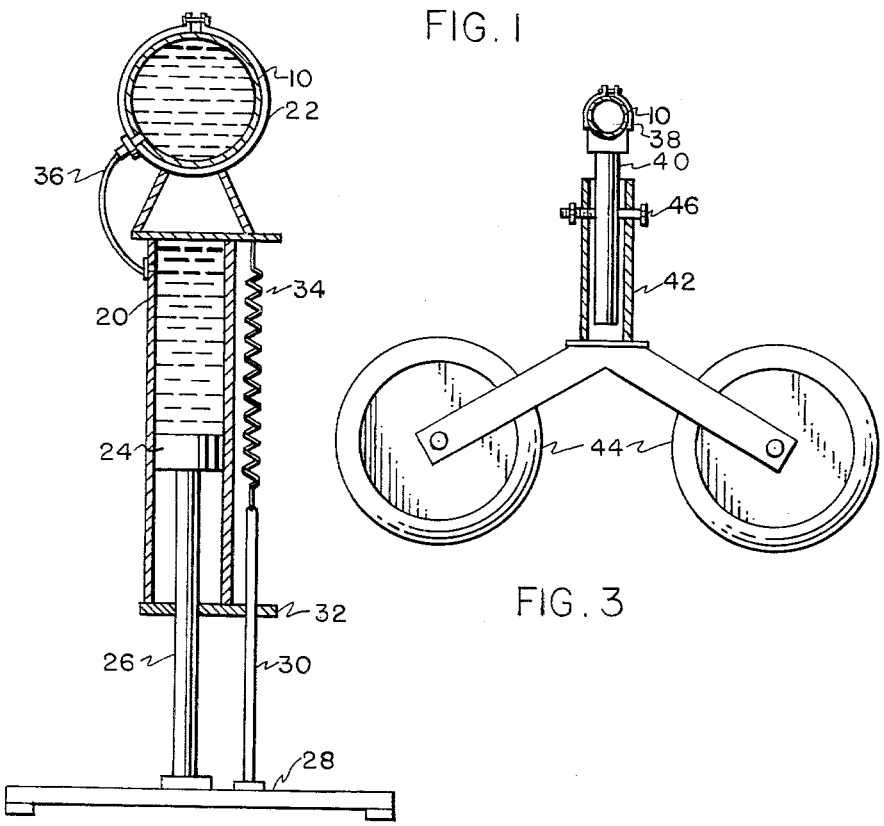
FIG. 2 is a sectional view taken on line 2—2 showing a stabilizer for an elevated pipe.
FIG. 3 shows a modified form of the stabilizer shown in FIG. 2.

FIG. 2 illustrates one embodiment of a support to support the pipe 10 while irrigating. The support includes a cylinder 20 which is structurally attached to the main pipe 10 by clamp 22 and depends therefrom. Piston 24 is operatively located within the cylinder 20. Piston rod 26 depends from the piston 24. Foot 28 is rigidly attached to the bottom of the piston rod 26. Rod 30 extends upward from the foot 28 through guide 32. Tension spring 34 attaches from the top of the cylinder 20 to the top of the rod 30. Tube 36 forms a water passageway or fluid connection from the main pipe 10 to the top of the cylinder 20.

Therefore, it may be seen that if there is pressure in the pipe 10, that the pressure is communicated through the tube 36 into the top of the cylinder 20. This presses the piston 24 down which forces the foot 28 down against the ground so that it stabilizes and supports the main pipe 10. However, if there is no pressure within the main pipe 10, the tension spring 34 lifts up the foot 28 so that the system may be moved by the vehicles 14 to another land.

FIG. 3 shows a modified form of stabilizer for the main pipe 10. It likewise, is connected to the pipe 10 by a clamp 38. Pendant 40 depends from the clamp 38. Sleeve 42 telescopes around the pendant 40. The sleeve 42 has a bifurcated element at the bottom so that a pair of ground engaging wheels 44 bear against the ground to stabilize the pipe 10. The height at which the pipe 10 is stabilized, is adjustable by inserting pin 46 through one of a plurality of holes extending through the sleeve 42 and pendant 40.

Figure 4:
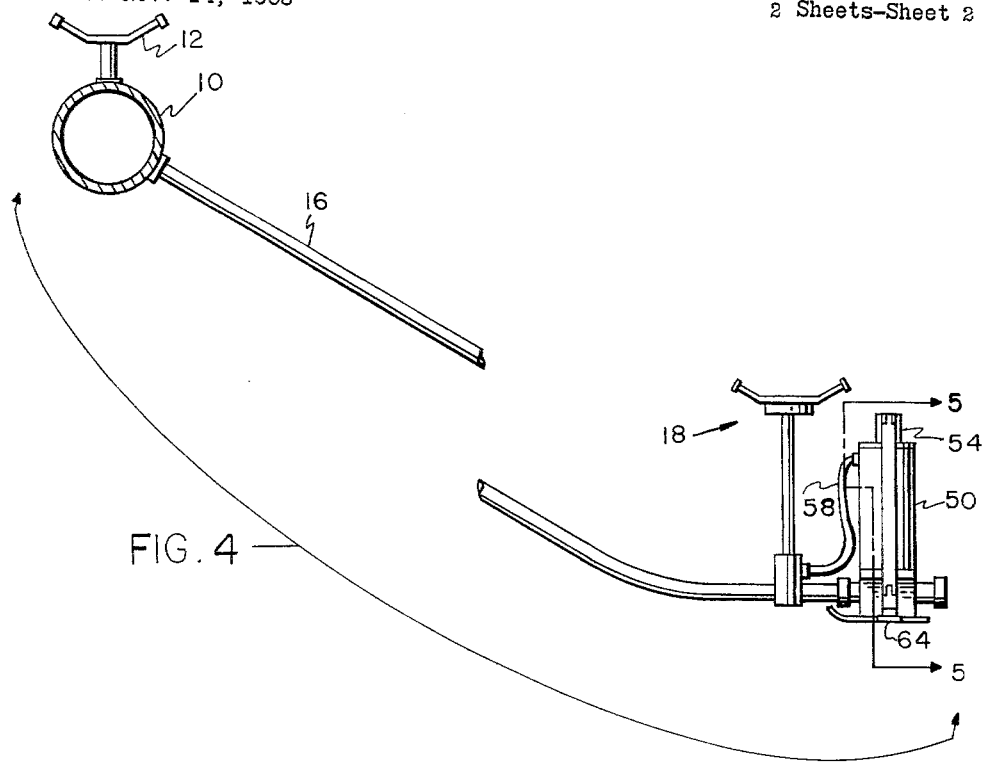
FIG. 4 is a sectional view taken on line 4—4 of FIG. 1 showing a stabilizer for a pipe which is moved axially through the field.
Figure 5:
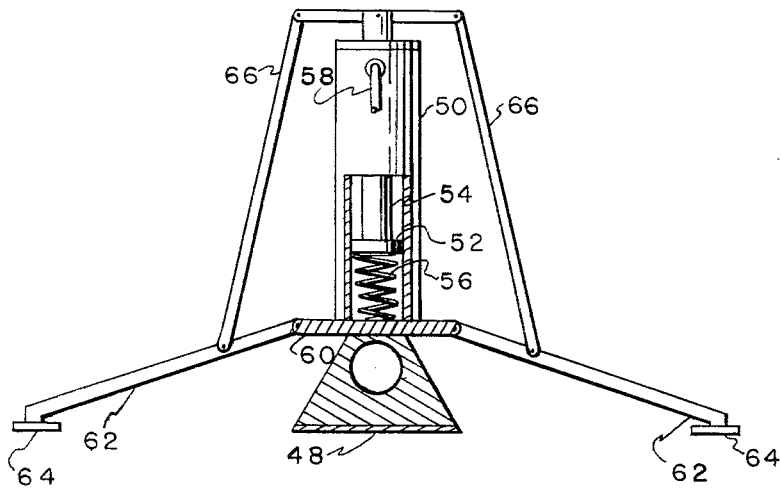
FIG. 5 is a view taken on line 5—5 of FIG. 4 showing the stabilizer of FIG. 4.

FIGS. 4 and 5 illustrate a different form of stabilizer. The stabilizer includes sled 48 which drags along the ground as the system is being moved. Cylinder 50 is attached to the sled 48 and extends vertically upward therefrom. Piston 52, within cylinder 50, has piston rod 54 extending upward therefrom. Compression spring 56 is located within the cylinder 50 below the piston 52 and biases the piston upward. Water passage or fluid connection in the form of tube 58 extends from the trail pipe 16 to the top of the cylinder 50. Two ears 60 are attached to the bottom of the cylinder 50. An arm 62 is pivoted to each of the ears 60. Inasmuch as the cylinder 50 is attached to the sled 48, thus it might be stated that the arms 62 are pivoted to the sled 48 inasmuch as that is the ultimate connection. Foot 64 is attached to the end of each arm 62. A pitman 66 extends from each arm 62, between the pivot point and foot, to the top of the piston rod 54. When there is water pressure within the trail tube 16, it is transmitted through the tube 58 to the top of the cylinder 50 and thus actuates the piston 52 so as to force the pitmans 66 downward thus forcing the feet 64 down. However, if there is no pressure within the trail pipe 16, the spring 56 biases the feet 64 upward through the mechanism of the piston rod 54, pitmans 66, and arms 62.

Although the embodiment shown in FIGS. 4 and 5 has been illustrated as attached to trail pipe 16, it will be understood that this embodiment might be utilized equally well upon an irrigation system wherein the principal pipe is towed axially by a tractor. Such a system as this is illustrated in the U.S. patent to Johnson, No. 2,834,634.

It will be apparent that the embodiments shown are only exemplary and that various modifications can be made in construction, materials, and arrangement within the scope of the invention as defined in the appended claims.

I claim as my invention:

1. In an irrigation system having
    (a) a pipe adapted to be dragged axially along the land to be irrigated,
    (b) a sprinkler on said pipe adapted to sprinkle water onto the land to be irrigated, and
    (c) means for supplying said pipe with water under pressure,
        the improvement comprising:
    (d) a sled attached to the pipe,
    (e) a cylinder extending vertically upward from the sled,
    (f) a piston in the cylinder,
    (g) a spring in the cylinder biasing the piston to one position,
    (h) a fluid connection from the pipe to the cylinder so that the pressure of the water in the pipe biases the piston in the opposite direction from the bias of the spring,
    (i) at least two legs pivoted to the sled, and
    (j) means interconnecting the piston and legs for moving the legs to a downward pipe stabilizing position when the piston is moved by water pressure, and
    (k) said means interconnecting the piston and legs acting as means for moving the legs to an upward pipe moving position when the piston is moved by spring bias.

2. In an irrigation system having
    (a) a pipe adapted to be dragged axially along the land to be irrigated,
    (b) a sprinkler on said pipe adapted to sprinkle water onto the land to be irrigated, and
    (c) means for supplying said pipe with water under pressure;
        the improvement comprising:
    (d) a sled attached to the pipe,
    (e) a cylinder extending vertically upward from the sled,
    (f) a piston in the cylinder,
    (g) a spring in the cylinder below the piston biasing the piston upward,
    (h) a fluid connection from the pipe to the top of the cylinder, so that the pressure of the water in the pipe biases the piston downward,
    (i) a piston rod extending upward from the piston,
    (j) two legs pivoted to the sled,
    (k) a foot on the end of each leg,
    (l) two pitmans,
    (m) one of said pitmans attached between each leg and the piston rod, so that when there is water pressure in the pipe the feet are pushed down and when there is no pressure in the pipe the feet are lifted up.

References Cited by the Examiner
UNITED STATES PATENTS

| | | | |
|---|---|---|---|
| 1,928,368 | 9/1933 | Coffey | 92—132 |
| 2,167,929 | 8/1939 | Johnson | 92—132 |
| 2,483,050 | 9/1949 | Hinchon | 138—106 |
| 2,892,593 | 6/1959 | Smeltzer | 239—177 |

FOREIGN PATENTS

| | | |
|---|---|---|
| 246,424 | 8/1963 | Australia. |
| 487,735 | 11/1952 | Canada. |
| 348,102 | 1/1922 | Germany. |

M. HENSON WOOD, Jr., *Primary Examiner.*

EVERETT W. KIRBY, *Examiner.*

D. MOSELEY, *Assistant Examiner.*